J. C. MACFARLANE & H. BURGE.
ROTARY ELECTRIC TRANSFORMER AND MOTOR GENERATOR.
APPLICATION FILED FEB. 7, 1910.
1,024,410.
Patented Apr. 23, 1912.
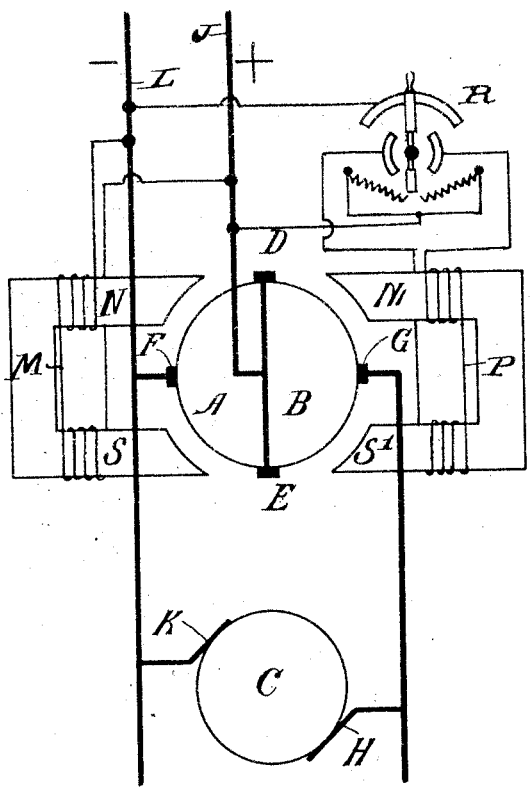
Witnesses.
Inventors
James C. Macfarlane
Harry Burge
By James L. Norris.
Atty.

UNITED STATES PATENT OFFICE.

JAMES COLQUHOUN MACFARLANE AND HARRY BURGE, OF ARC WORKS, CHELMSFORD, ENGLAND, ASSIGNORS TO THE FIRM OF CROMPTON AND COMPANY LIMITED, OF ARC WORKS, CHELMSFORD, ENGLAND.

ROTARY ELECTRIC TRANSFORMER AND MOTOR-GENERATOR.

1,024,410.         Specification of Letters Patent.         Patented Apr. 23, 1912.

Application filed February 7, 1910. Serial No. 542,484.

*To all whom it may concern:*

Be it known that we, JAMES COLQUHOUN MACFARLANE and HARRY BURGE, subjects of the King of Great Britain, residing at Arc Works, Chelmsford, in the county of Essex, England, have invented certain new and useful Improvements in Rotary Electric Transformers and Motor-Generators, of which the following is a specification.

This invention relates to a dynamo electric machine of the kind which has a single ring armature, the said armature being divided into a motor part and a generator part by a pair of auxiliary brushes such as are hereafter referred to, along a plane which passes through the said brushes, and a field magnet also divided into a motor part and a generator part, each part being provided with independent windings. In addition to said auxiliary brushes the machine is provided with a pair of ordinary brushes called the main brushes.

The present invention consists in adapting such a machine to the control of electric motors on the well-known "Ward-Leonard" principle, and in the application of such a machine to electrical regenerative control apparatus and systems. To this end the short circuited brushes are directly connected to one of the supply mains, say the positive main, while one of the main brushes is directly connected to the negative or other supply main. The second main brush is connected to one terminal of the driven motor whose speed is to be controlled, the other terminal of which is connected directly to the negative supply main.

The invention is illustrated diagrammatically in the accompanying drawing.

A direct current armature divided into two portions A, B, respectively, is adapted to rotate in a four-pole field. Said armature is provided with four brushes, two of which D, E, are placed in the neutral position, and the second pair F, G, in the ordinary position. Said brushes D, E, are connected together electrically and are called the short circuited auxiliary brushes and the conductor joining said auxiliary brushes D, E, is connected to one pole of the supply mains, say the positive pole J.

The pair of short-circuited auxiliary brushes D, E, divide the armature into the two portions A, B, each of which may serve sometimes as a motor and sometimes as a generator, depending upon conditions which will be hereafter explained.

The four-pole field comprises field magnets N, S, of the portion A and field magnets $N_1$, $S_1$, of the portion B. The magnets N, S, are provided with a winding M connected across the supply mains J, L, and serving as a constant separate excitation for the half A of the armature, and the magnets $N_1$, $S_1$, are provided with a winding P also connected across the supply mains J, L, but in series with a reversible rheostat R, said winding P serving as a variable reversible separate excitation for the half B of the armature, operating as hereinafter explained. The second pair of brushes F, G, are called the main brushes and one of these, say the brush F is connected directly to the negative pole L of the supply mains; the brush G being connected to the brush H of a motor to be driven C whereof the other brush K is connected to the negative supply main L. It will thus be seen that the motor to be driven C is connected across the supply mains J, L, through the half B of the motor generator and may receive an E. M. F. of anything from no voltage to that of the supply mains J, L, or an E. M. F. of anything from that of the supply mains J, L, up to twice that of the supply voltage, depending upon the excitation of the field M of the half B of the armature, which can be varied as is well known in magnitude and sign by means of the reversing rheostat R controlling such excitation. For instance the half B of the armature may be generating an E. M. F. equal and opposite to the E. M. F. of the supply and the motor C will under those circumstances receive no E. M. F. and will therefore remain stationary. If on the other hand the shunt winding of the half B is completely reversed and brought up to the full strength in the opposite direction, that is to say in the same sense as the E. M. F. of the supply, then the motor C will receive not only the full voltage of the line, but a voltage equal to twice this, due to the fact that the motor generator is helping the line to the extent of its own voltage, and said motor C will therefore run at full speed. When this condition obtains, the distribution of the magnetism in the poles $N_1$, $S_1$ becomes reversed owing to the reversal in the direction of the shunt current, and the machine consequently becomes a four-pole machine in the ordinary sense, and remains so as long as the voltage of the secondary circuit is double that of the primary circuit.

When the motor C is running under load and the volts across the motor C are less than the supply voltage, the part B of the motor generator works as a motor, and the part A works as a generator and when the volts across the motor C are greater than the supply volts the part B of the motor generator works as a generator, and the part A as a motor. The converse obtains when the apparatus is regenerating, that is to say when the motor C is returning current to the line, for in this case when the volts across the motor C are less than the supply voltage the part B works as a generator and the part A as a motor and when the volts across the motor C are greater than the supply volts the part B works as a motor, and the part A as a generator.

What we claim is:—

An electric motor control system comprising supply mains, a direct current ring armature adapted to rotate within four polar limbs, a pair of main brushes to said armature, a pair of short-circuited auxiliary brushes arranged at right angles to said main brushes and connected to one of said supply mains and dividing said armature into two portions, a constant separate excitation to one portion of said armature, a variable reversible separate excitation to the second portion of said armature serving to change the direction of the flow of the current through two of said polar limbs when the secondary voltage is raised above the voltage of the mains, a direct current motor, brushes to said direct current motor, one of said motor brushes being connected to the other of said supply mains and to one of said main brushes, and the other of said motor brushes being connected to the other of said main brushes.

In testimony whereof we have hereunto set our hands in presence of two subscribing witnesses.

JAS. COLQUHOUN MACFARLANE.
HARRY BURGE.

Witnesses:
ERNEST JOHN HILL,
HARRY J. STOGDEN.